(12) United States Patent
Kim et al.

(10) Patent No.: US 10,976,507 B2
(45) Date of Patent: Apr. 13, 2021

(54) OPTICAL MODULE

(71) Applicant: OPTOMIND INC., Suwon-si (KR)

(72) Inventors: Taeyong Kim, Suwon (KR); Yong Geon Lee, Seoul (KR); Yung Sung Son, Suwon (KR)

(73) Assignee: OPTOMIND INC.

( * ) Notice: Subject to any disclaimer, the term of this patent is extended or adjusted under 35 U.S.C. 154(b) by 0 days.

(21) Appl. No.: 16/710,562

(22) Filed: Dec. 11, 2019

(65) Prior Publication Data

US 2020/0379193 A1 Dec. 3, 2020

Related U.S. Application Data

(60) Provisional application No. 62/856,884, filed on Jun. 4, 2019.

(30) Foreign Application Priority Data

| Jun. 3, 2019 | (KR) | KR10-2019-0065166 |
| Jul. 26, 2019 | (KR) | KR10-2019-0091008 |

(51) Int. Cl.
| *G02B 6/42* | (2006.01) |
| *G02B 6/32* | (2006.01) |
| *G02B 6/34* | (2006.01) |
| *H04B 10/50* | (2013.01) |
| *H04B 10/80* | (2013.01) |
| *H04B 10/67* | (2013.01) |

(52) U.S. Cl.
CPC ........... *G02B 6/4214* (2013.01); *G02B 6/322* (2013.01); *G02B 6/34* (2013.01); *G02B 6/423* (2013.01); *G02B 6/4206* (2013.01); *G02B 6/4246* (2013.01); *H04B 10/50* (2013.01); *H04B 10/67* (2013.01); *H04B 10/80* (2013.01)

(58) Field of Classification Search
None
See application file for complete search history.

(56) References Cited

U.S. PATENT DOCUMENTS

| 5,155,786 A * | 10/1992 | Ecker | G02B 6/4202 257/713 |
| 2018/0299630 A1 | 10/2018 | Son et al. | |
| 2018/0306985 A1 | 10/2018 | Son et al. | |
| 2019/0265422 A1 | 8/2019 | Son et al. | |

OTHER PUBLICATIONS

U.S. Appl. No. 16/288,759, filed Feb. 28, 2019, Yung Sung Son et al.
U.S. Appl. No. 16/429,351, filed Jun. 3, 2019, Yung Sung Son et al.
U.S. Appl. No. 62/856,895, filed Jun. 4, 2019, Yung Sung Son et al.
U.S. Appl. No. 16/330,396, filed Mar. 5, 2019, Yung Sung Son et al.

* cited by examiner

*Primary Examiner* — Chad H Smith
(74) *Attorney, Agent, or Firm* — Harness, Dickey & Pierce, P.L.C.

(57) ABSTRACT

An optical module using an optical assembly for optical transmission and reception is disclosed. At least one embodiment of the present disclosure provides an optical module which can improve the productivity by enabling efficient optical alignment and optical coupling between optical devices and optical fibers in an optical transmission-reception module using a plurality of optical fibers while increasing the data transfer rate per unit module.

12 Claims, 12 Drawing Sheets

OPTICAL MODULE

RELATED APPLICATIONS

This application is a non-provisional application claiming the benefit of priority from U.S. provisional patent application No. 62/856,884, filed on Jun. 4, 2019, Korea Patent Application No. 10-2019-0065166, filed on Jun. 3, 2019, and Korea Patent Application No. 10-2019-0091008, filed on Jul. 26, 2019, all of which are incorporated herein by reference.

TECHNICAL FIELD

The present disclosure generally relates to an optical module.

BACKGROUND

The statements in this section merely provide background information related to the present disclosure and do not necessarily constitute prior art.

The market demand for large-capacity data transmission is rapidly increasing with the recent rise in cloud data centers, growth of Internet of things (IoT), increase in consumer and business application software, increase in hyperscale data centers, data center virtualization, and increasing big data.

Conventional data center interconnect (DCI) technology has evolved to focus on expanding the transmission bandwidth to accommodate emerging services. On the other hand, DCI technology has also changed with the recent trends of data center development toward cloud-based open architecture.

The most popular types of physical interfaces employed in data center interconnects include quad small-form factor pluggable (QSFP) and small-form factor pluggable (SFP). When a data center is configured using a detachable module such as a QSFP or an SFP, an optical port is easily upgraded and the possibility of generating electromagnetic interference is low.

When configuring the ports of the most commonly used 19-inch rack-mountable switches in the data center to accommodate only QSFP modules, approximately 32 ports can be configured, as compared to more than 32 ports when configuring the ports to accommodate SFP modules which have a smaller footprint than that of the QSFP modules.

Therefore, in order to improve the efficiency of a data center using these types of pluggable modules, it is necessary to increase the number of ports that can be formed in one switch, increase the number of channels that one port can accommodate as well as the data rate per channel.

However, the size of the QSFP or SFP module is stipulated by the standard, and there are also technical limitations in reducing the type, number or size of various internal components, for example, electronic devices and optical devices to be mounted therein.

The above-described problems may be solved by forming a plurality of optical assemblies in spatially separated positions and coupling optical fibers partially or entirely bent to each of the plurality of optical assemblies. However, bending of a part or the whole of the optical fiber impedes the performance of optical alignment or coupling between the optical fiber and the optical assembly, thereby deteriorating the productivity and the stability of optical coupling.

Accordingly, there is a need for an optical module capable of facilitating optical coupling between an optical fiber and an optical assembly, thereby improving productivity, which is further capable of stably maintaining optical coupling between the optical fiber and the optical assembly.

SUMMARY

At least one embodiment of the present disclosure seeks to provide an optical module that can improve the productivity by enabling efficient optical coupling between optical devices and optical fibers in an optical transmission-reception module using a plurality of optical fibers while increasing the data rate per unit module.

In accordance with at least one embodiment, the present disclosure provides an optical module including a substrate, a first optical assembly, and a second optical assembly. The substrate is configured to support at least one optical device and at least one electronic device. The first optical assembly is configured to optically couple a first optical fiber inserted from outside to a first optical device. The second optical assembly is configured to optically couple a second optical fiber inserted from outside to a second optical device. Each of the first optical assembly and the second optical assembly is disposed at a predetermined position on the substrate, and the second optical fiber passes through an interior of the first optical assembly, to be optically coupled with the second optical assembly.

DETAILED DESCRIPTION

Figure 1:
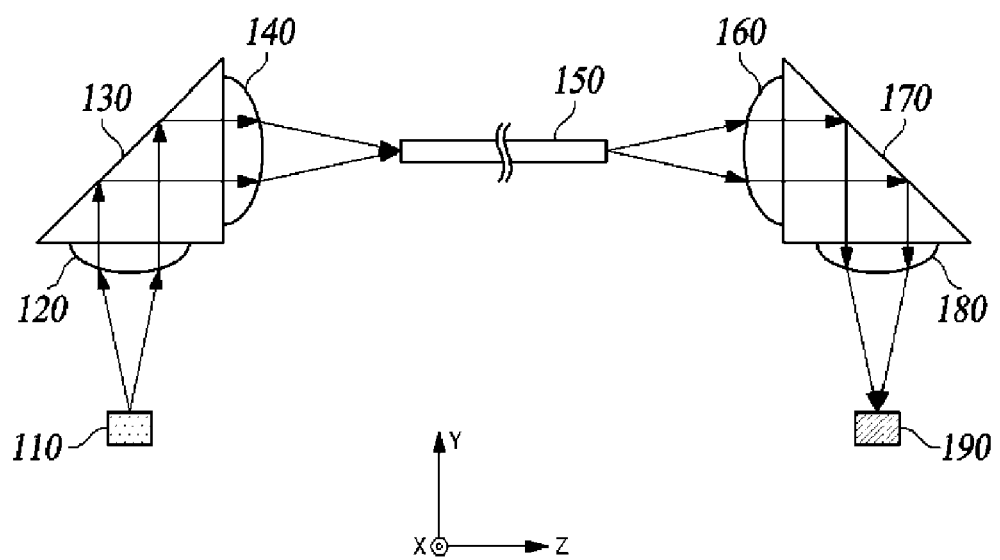
FIG. 1 is a conceptual diagram of an optical system employed in a conventional optical module.

Hereinafter, at least one embodiment of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), a), b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary.

An optical module 300 according to embodiments of the present disclosure will be described with reference to the accompanying drawings. For the sake of clarity, the description will be made with reference to a Cartesian coordinate system defined in the x-direction, the y-direction, and the z-direction.

FIG. 1 conceptually illustrates an optical system employed in a conventional optical module.

The optical system applied to the conventional optical module includes a transmitter collimation lens 120, a transmitter reflection prism 130, a transmitter focusing lens 140, an optical fiber 150, a receiver collimation lens 160, a receiver reflection prism 170, and a receiver focusing lens 180. Here, the optical system including the transmitter collimation lens 120 through the transmitter focusing lens 140 is typically employed in an optical transmission module, and the optical system including the receiver collimation lens 160, the receiver reflection prism 170, and the receiver focusing lens 180 is typically employed in an optical reception module.

From a light source 110, light is emitted with a predetermined divergence in a direction perpendicular to the surface of the light source 110 and is incident on the transmitter collimation lens 120. The transmitter collimation lens 120 converts light delivered from the light source 110 into parallel beam of light. The transmitter reflection prism 130 serves to change the path of the light emitted from the transmitter collimation lens 120 by 90° toward the optical fiber 150, and the transmitter focusing lens 140 reflects the light reflected from the transmitter reflection prism 130 and focuses the same into the optical fiber 150. The light transmitted and emitted from the optical fiber 150 is incident on the receiver collimation lens 160 which converts the delivered light into parallel beam of light. The parallel beam of light is reflected after a 90° change of its path by the receiver reflection prism 170, as in the optical transmission module. The light reflected by the receiver reflection prism 170 is incident on a photodiode 190 through the receiver focusing lens 180, which completes transmission of the optical signal from the optical transmitter module to the optical receiver module.

The optical transmission module needs an optical coupling distance between the optical system and the optical fiber as much as the focal length of the transmitter focusing lens 140. Similarly, the optical receiver needs an optical path length to form parallel beam of light between the optical fiber 150 and the receiver collimation lens 160. Such distance setting requires special optical fiber alignment equipment. Here, an optical coupling means an optical connection between the respective components constituting the optical system.

When such a conventional optical system is used, there is a need for high-priced instruments that enable accurate and precise optical coupling between the elements forming the optical system. In addition, optical alignment and assembly in manufacturing are sensitive to the tolerance between the optical system and the optical fiber, which requires highly precise control of mechanical tolerances.

In the conventional optical system, the optical fiber 150 is supposed to be exposed to the air and is susceptible to contamination by fine dust or foreign matter, resulting in a critical effect on the optical coupling efficiency depending on the severity of contamination. In addition, exposure of the core of the optical fiber 150 may cause additional optical coupling loss due to Fresnel loss, which will reduce reliability.

In addition, since the optical coupling efficiency of the conventional optical system depends on how the end face of the optical fiber 150 is cut, special processing of the end face of the optical fiber 150 is indispensable. Unless these issues are solved, a product from using a conventional optical system is highly susceptible to faulty operations and defects. Such goods as produced with these inherent issues will be difficult to assemble in a passive alignment.

Figure 2:
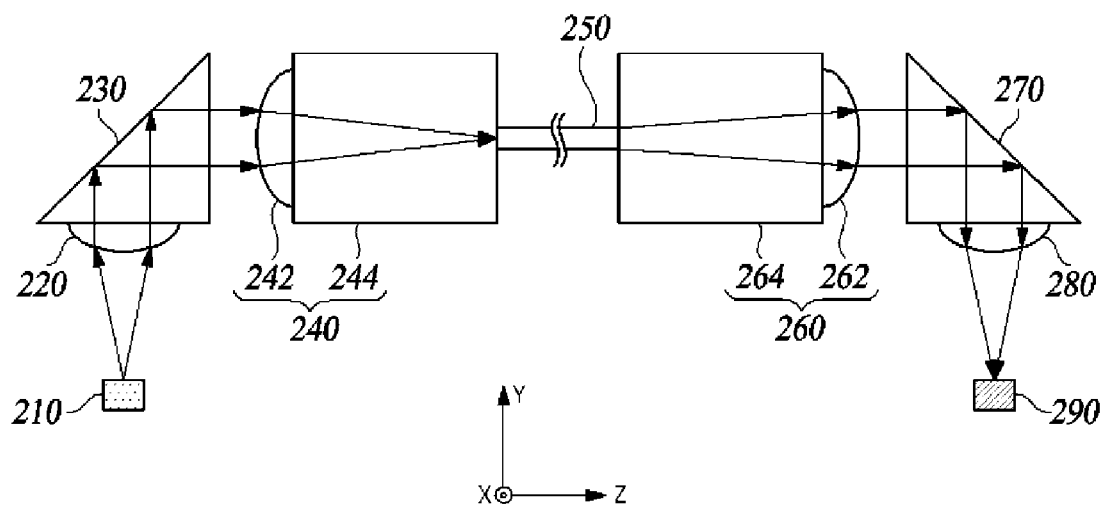
FIG. 2 is a conceptual diagram of an optical system employed in an optical module according to at least one embodiment of the present disclosure.

FIG. 2 conceptually illustrates an optical system employed in an optical module according to at least one embodiment of the present disclosure.

The components of the optical system included in the optical module according to at least one embodiment of the present disclosure are similar to those included in the conventional optical system, but they have fundamental structural differences. The transmitter optical system in the optical module according to at least one embodiment includes a transmitter collimation lens 220, a transmitter reflection prism 230, a transmitter focusing lens unit 240 and an optical fiber 250. Here, the transmitter focusing lens unit 240 includes a transmitter focusing lens 242 and a transmitter spacer 244.

The transmitter collimation lens 220 converts light from an electrical-to-optical conversion device 210 into parallel beam of light, and it transmits the parallel beam of light to the transmitter reflection prism 230. Here, the light from the electrical-to-optical conversion device 210 is emitted in the y-direction. The transmitter reflection prism 230 changes the path of the parallel beam of light from the transmitter collimation lens 220 by 90° and sends it to the transmitter focusing lens 242. In other words, the transmitter reflection prism 230 serves to change the light moving in the y-direction to the z-direction. The x-direction thickness of the transmitter spacer 244 corresponds to the focal length of the transmitter focusing lens 242. Equalizing the x-direction thickness of the transmitter spacer 244 to the focal length of the transmitter focusing lens 242 can concentrate light passing through the transmitter focusing lens 242 into the core of the optical fiber 250.

In the receiver-optical system employed in the optical module according to at least one embodiment of the present disclosure, the collimation lens 280 and the focusing lens 262 are opposite in terms of lens function to those of the lenses 220, 242 in the transmitter optical system. Hereinafter, an optical system including various individual functional elements will be referred to as an optical assembly.

Figure 3:
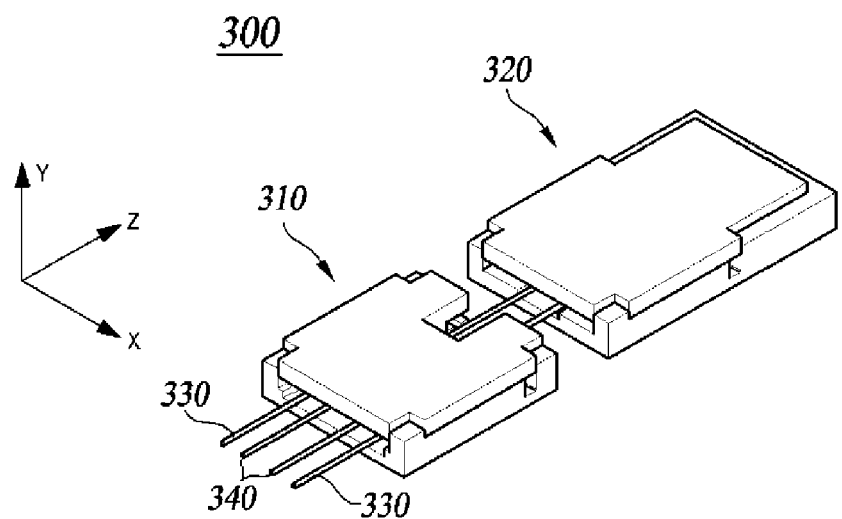
FIG. 3 is a perspective view of an optical module according to at least one embodiment of the present disclosure.

FIG. 3 is a perspective view of an optical module according to at least one embodiment of the present disclosure.

Referring to FIG. 3, the optical module 300 according to the present embodiment includes a first optical assembly 310, a second optical assembly 320, a pair of first optical fibers 330 and a pair of second optical fibers 340.

Each of the first optical assembly 310 and the second optical assembly 320 may be formed using injection molding, a three-dimensional printing or other processes by using a synthetic resin.

The pair of first optical fibers 330 are optically aligned or coupled with the optical systems included in the first optical assembly 310. The pair of second optical fibers 340 are optically aligned or coupled with the optical systems included in the second optical assembly 320.

The first optical fiber 330 or/and the second optical fiber 340 may include a core and a cladding. The first optical fiber 330 or the second optical fiber 340 may be made of high-purity glass or synthetic resin. Typically, the refractive index of the core is formed to be larger than that of the cladding. The larger refractive index of the core than the cladding allows the light incident on the core of the first optical fiber 330 or the second optical fiber 340 to be totally reflected at the interface between the core and the cladding and to be transmitted over a long distance without an external loss.

Here, the core and the cladding are described as having discontinuous refractive index values different from each other. However, the refractive index may be continuously decreased from the center of the first optical fiber 330 or the second optical fiber 340 toward the outside. In addition, the refractive index may be designed to have a distribution that changes linearly around the core or changes rapidly in the form of a quadratic curve, or it may have other distributions.

In order to protect the core and the cladding of the first optical fiber 330 or the second optical fiber 340 from external impact or damage, a jacket may be further formed on the outer side of the cladding.

Figure 4A:
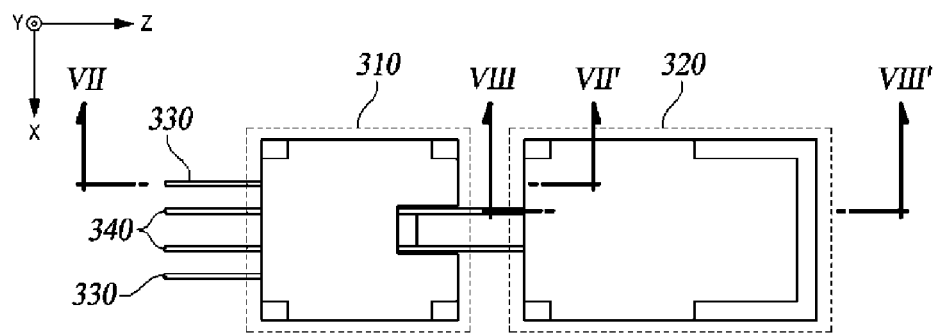
FIGS. 4A and 4B are a top view and an exploded top view, respectively, of an optical module according to at least one embodiment of the present disclosure.
Figure 4B:
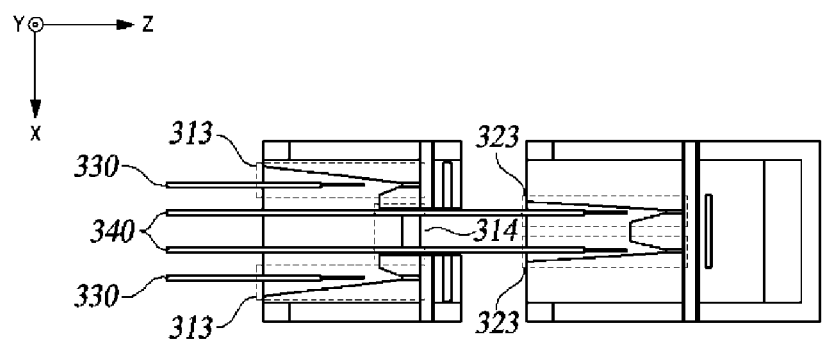

FIGS. 4A and 4B are a top view and an exploded top view, respectively, of an optical module according to at least one embodiment of the present disclosure.

As shown in FIGS. 4A and 4B, the first optical fibers 330 and the second optical fibers 340 are arranged in parallel one another. Here, the parallel arrangement between the first optical fibers 330 and the second optical fibers 340 means that both the first optical fibers 330 and the second optical fibers 340 are arranged in the z-direction. One end of each first optical fiber 330 is formed within the first optical assembly 310 for optical coupling with the optical components included in the first optical assembly 310. The other end of the first optical fiber 330 may be processed in a form that can be coupled to an external optical module or may be directly coupled to another optical assembly included in an external optical module.

The second optical fibers 340 pass through the interior of the first optical assembly 310 and are optically coupled to the optical components disposed inside the second optical assembly 320. Here, the direction in which the second optical fibers 340 penetrate the inside of the first optical assembly 310 is also the z-direction.

However, for the purpose of efficient and stable optical coupling between optical devices on a substrate and the optical fibers 330, 340, the arrangement of the first optical fibers 330 and the second optical fibers 340 is not limited to that as illustrated, but it may vary depending on the positions and forms of the optical devices or the optical systems disposed inside the first optical assembly 310 and the second optical assembly 320.

Here, the optical devices on the substrate include electrical-to-optical conversion devices for converting an electric signal into an optical signal or optical-to-electrical conversion devices for converting an optical signal into an electric signal.

In FIG. 4A, the first optical fibers 330 are disposed outside the second optical fibers 340, but the relative positions of the first optical fibers 330 and the second optical fibers 340 can be freely changed. For example, the first optical fibers 330 may be disposed between the two second optical fibers 340.

Referring to FIG. 4B, each first optical fiber 330 is configured to have one end positioned inside the first optical assembly 310, and each second optical fiber 340 is configured to have one end positioned inside the second optical assembly 320.

The first optical assembly 310 includes a pair of first-optical-fiber guides 313 and a third-optical-fiber guide 314, and the second optical assembly 320 includes a pair of second-optical-fiber guides 323.

The first-optical-fiber guide 313 serves to allow the first optical fiber 330 to be smoothly inserted into the first optical assembly 310 from the outside thereof, or to support or fixate the first optical fiber 330. Alternatively, the first-optical-fiber guide 313 serves to allow the first optical fiber 330 to be smoothly inserted into the first optical assembly 310 from the outside thereof while supporting and securing the first optical fiber 330. In the case of FIG. 4B, the first optical fiber 330 is inserted into the first optical assembly 310 in the z-direction.

The first-optical-fiber guide 313 has one end formed to be wide and the opposite end formed in a narrow funnel shape, to guide the introduction of the first optical fiber 330 and to further guide the introduced first optical fiber 330 toward a smooth arrival at a predetermined point in the first optical assembly 310.

The third-optical-fiber guide 314 serves to allow the second optical fiber 340 to be smoothly inserted into the first optical assembly 310 from the outside thereof, or to support or fixate a part of the second optical fiber 340. Alternatively, the third-optical-fiber guide 314 serves to allow the second optical fiber 340 to be smoothly inserted into the first optical assembly 310 from the outside thereof while supporting and securing a part of the second optical fiber 340.

When the positions of the first optical fibers 330 and the second optical fibers 340 are different from those of FIG. 4B, for example, when the first optical fibers 330 are located between the second optical fibers 340, the third-optical-fiber guide 314 may be formed to have a different structure from that of FIG. 4B.

The second-optical-fiber guide 323 serves to allow the second optical fiber 340 to be smoothly inserted into the second optical assembly 320 from the outside thereof, or to support or fixate the second optical fiber 340. Alternatively, the second-optical-fiber guide 323 serves to allow the second optical fiber 340 to be smoothly inserted into the second optical assembly 320 from the outside thereof while supporting and securing the second optical fiber 340.

In addition, the second-optical-fiber guide 323 has one end formed to be wide where it receives the second optical fiber 340 and has the opposite end formed in a narrow funnel shape, to guide the introduction of the second optical fiber 340 and to further guide the introduced second optical fiber 340 toward a smooth arrival at a predetermined point in the second optical assembly 320. In this case, the second optical fiber 340 is inserted into the second optical assembly 320 in the z-direction.

Figure 5A:
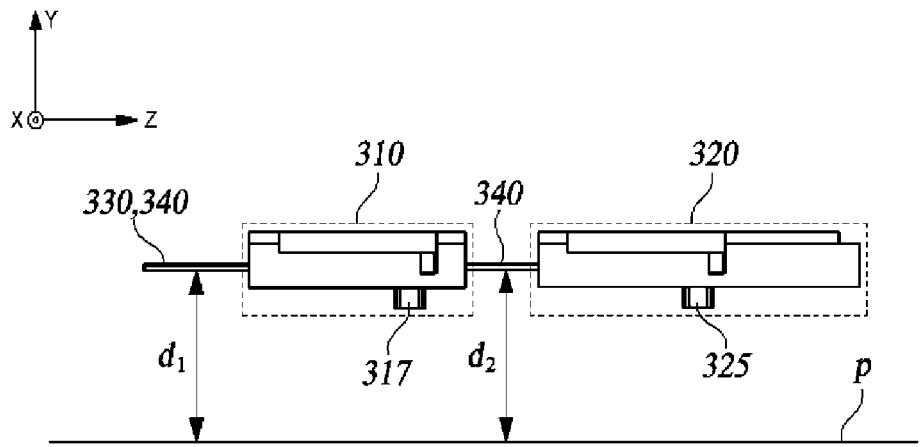
FIGS. 5A and 5B are side and bottom views, respectively, of an optical module according to at least one embodiment of the present disclosure.
Figure 5B:
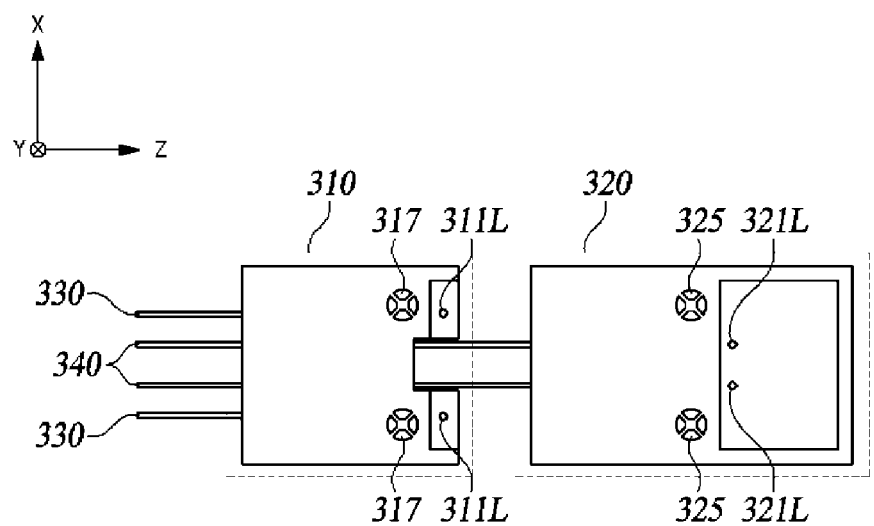

FIGS. 5A and 5B are side and bottom views, respectively, of an optical module according to at least one embodiment of the present disclosure.

As shown in FIG. 5A, both the first optical fibers 330 and the second optical fibers 340 are in parallel with a virtual plane p. Here, the virtual plane p is the x-z plane which is perpendicular to the y-direction. The virtual plane p may be defined by a first distance d1 that is the distance between the first optical fiber 330 and the virtual plane p, or by a second distance d2 that is the distance between the second optical fiber 340 and the virtual plane p. Here, first distance d1 means a distance in the y-direction between the virtual plane p and the first optical fiber 330, and second distance d2 means a distance in the y-direction between the virtual plane p and the second optical fiber 340.

FIG. 5A illustrates that the first distance d1 and the second distance d2 are the same, although the first distance d1 of the first optical fiber 330 to the virtual plane p may be different from the second distance d2 of the second optical fiber 340 to the virtual plane p. For example, when the optical devices optically aligned or optically coupled to the first optical assembly 310 have different optical properties from those of the optical devices that are optically aligned or optically coupled with the second optical assembly 320, the optical system included in the first optical assembly 310 may have a different structure from that of the optical system included in the second optical assembly 320, or the supporting structure of the first optical fiber 330 may be different from that of the second optical fiber 340. In this case, the first distance d1 and the second distance d2 may be different from each other.

The first optical fiber 330 and the second optical fiber 340 are arranged to be separated from the virtual plane p by a predetermined distance or distances, and the plane passing through both the first optical fiber 330 and the second optical fiber 340 is in parallel with the virtual plane p.

Here, the virtual plane p may be replaced by a substrate. The substrate included in the optical module 300 according to at least one embodiment of the present disclosure serves as a reference for optical alignment and optical coupling between the optical system included in the first optical assembly 310 and optical devices or between the optical system included in the second optical assembly 320 and optical devices. The substrate supports or fixates the optical devices and electronic devices, and it serves to transfer the heat generated by the optical devices and the electronic devices to the outside of the module. Various components for large-bandwidth optical transmission can be arranged on the substrate in addition to optical devices and electronic devices.

The substrate may include a rigid printed circuit board made of hard material with a high degree of rigidity for rigidly supporting other components, and a flexible printed circuit board made of soft material and bendable. Further, the substrate may be formed to include at least one subsidiary substrate layer, and each subsidiary substrate layer may be formed of a material having a different dielectric constant. Further, the subsidiary substrate layer may include a top or bottom conductive layer and may include a metal layer penetrating the subsidiary substrate layer.

As shown in FIGS. 5A and 5B, the first optical assembly 310 includes at least one first post 317 at the bottom thereof. The second optical assembly 320 includes at least one second post 325 at the bottom thereof. The first posts 317 support optical alignment or optical coupling between the optical devices of the substrate and the optical system of the first optical assembly 310 when the latter is coupled to the substrate, and they serve as a reference for the optical alignment or coupling. The second posts 325 support optical alignment or optical coupling between the optical devices of the substrate and the optical system of the second optical assembly 320 when the latter is coupled to the substrate, and they serve as a reference for the optical alignment or coupling.

The first optical assembly 310 includes a pair of first lens units 311L at a lower portion thereof. As described below with reference to FIG. 7B, the pair of first lens units 311L are optically aligned or optically coupled with the optical devices of the substrate, thereby optically coupling the optical paths in the first optical assembly 310 to the optical devices on the substrate. For example, an optical signal outputted from the first optical fiber 330 propagates one optical path provided in the first optical assembly 310 and then is outputted from the first lens unit 311L and finally reaches the optical device (e.g., optical-to-electrical conversion device) on the substrate. For another example, an optical signal outputted from the optical device (e.g., electrical-to-optical conversion device) on the substrate enters another optical path in the first optical assembly 310 through the first lens unit 311L, and then propagates the optical path provided in the first optical assembly 310 and finally reaches the first optical fiber 330.

The second optical assembly 320 includes a pair of second lens units 321L at a lower portion thereof. As described below with reference to FIG. 8B, the pair of second lens units 321L are optically aligned or optically coupled with the optical devices of the substrate, thereby optically coupling the optical paths in the second optical assembly 320 to the optical devices on the substrate. For example, an optical signal outputted from the second optical fiber 340 propagates one optical path provided in the second optical assembly 320 and then is outputted from the first lens unit 321L and finally reaches the optical device (e.g., optical-to-electrical conversion device) on the substrate. For another example, an optical signal outputted from the optical device (e.g., electrical-to-optical conversion device) on the substrate enters another optical path provided in the second optical assembly 320 through the second lens unit 321L, and then propagates the optical path provided in the second optical assembly 320 and finally reaches the second optical fiber 340.

Here, the electrical-to-optical conversion device may be referred to as a light source, and mainly refers to a semiconductor laser device.

The radiation angle of the light emitted from the electrical-to-optical conversion device depends on the geometry of the electrical-to-optical conversion device, the material constituting the electrical-to-optical conversion device, and the like. Assuming that no lens is used, a typical vertical-cavity surface-emitting laser (VCSEL) has a radiation angle of between 10° and 30°.

Ideally, when light having a radiation angle of between 10° and 30° passes through the first lens unit 311L or the second lens unit 321L, it is converted into light having a radiation angle of 0°. The optical alignment and optical coupling of the light (optical signal) after passing through the first lens unit 311L and the second lens unit 321L is much easier than those of diverging or converging light.

Figure 6:
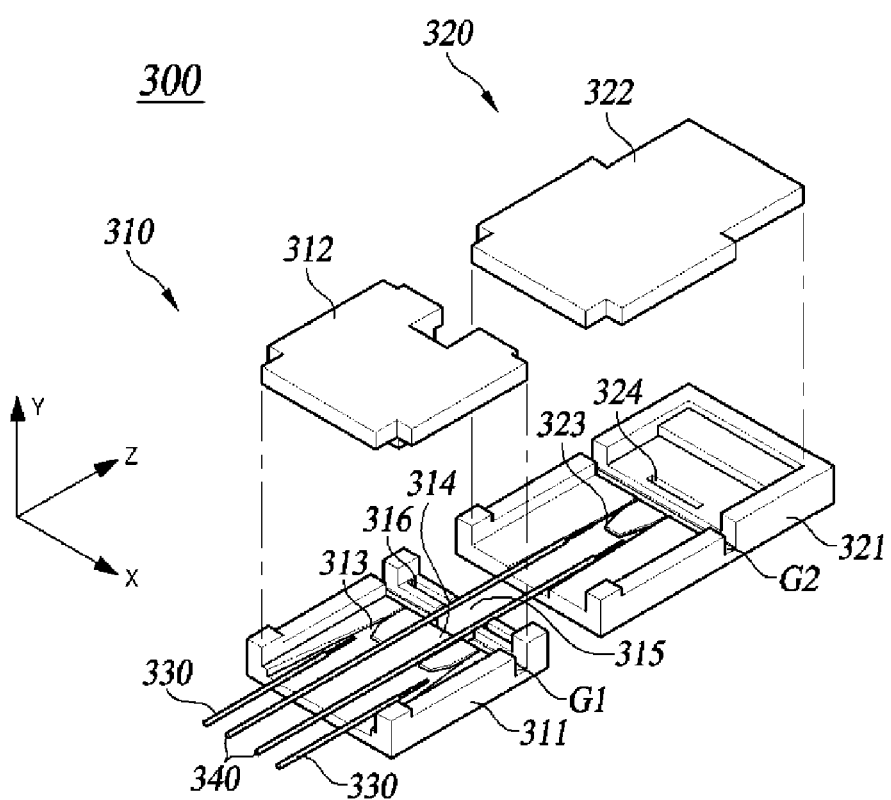
FIG. 6 is an exploded perspective view of an optical module according to at least one embodiment of the present disclosure.

FIG. 6 is an exploded perspective view of an optical module according to at least one embodiment of the present disclosure.

An optical module 300 according to at least one embodiment of the present disclosure includes a first optical assembly 310 and a second optical assembly 320. The first optical assembly 310 includes at least one first-optical-fiber guide 313 and includes a third-optical-fiber guide 314 and a passage 315.

The first-optical-fiber guide 313 has one end formed to be wide and the opposite end formed in a narrow funnel shape, to guide the introduction of the first optical fiber 330 and to further guide the introduced first optical fiber 330 toward a smooth arrival at a predetermined point in the first optical assembly 310.

The third-optical-fiber guide 314 assists in the introduction of the second optical fibers 340 and allows the introduced second optical fiber 340 to be supported or fixed within the first optical assembly 310.

A portion of the second optical fiber 340 existing inside the first optical assembly 310, and another portion of the second optical fiber 340 existing inside the second optical assembly 320 maintain a straight line. In other words, the second optical fiber 340 remains straight across the two optical assemblies 310 and 320, without bending. Each of the first optical assembly 310 and the second optical assembly 320 has an internal structure that enables the second optical fiber 340 to maintain a straight line. The first optical fibers 330 included in the optical module 300 according to at least one embodiment are also in line with the second optical fiber 340.

Figure 7A:
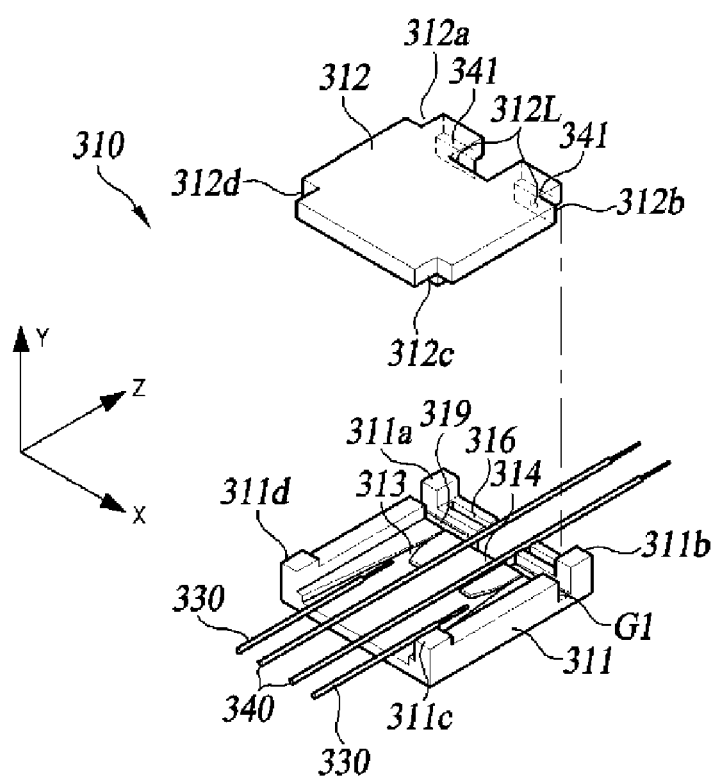
FIG. 7A is an exploded perspective view of a first optical assembly included in an optical module according to at least one embodiment of the present disclosure.
Figure 7B:
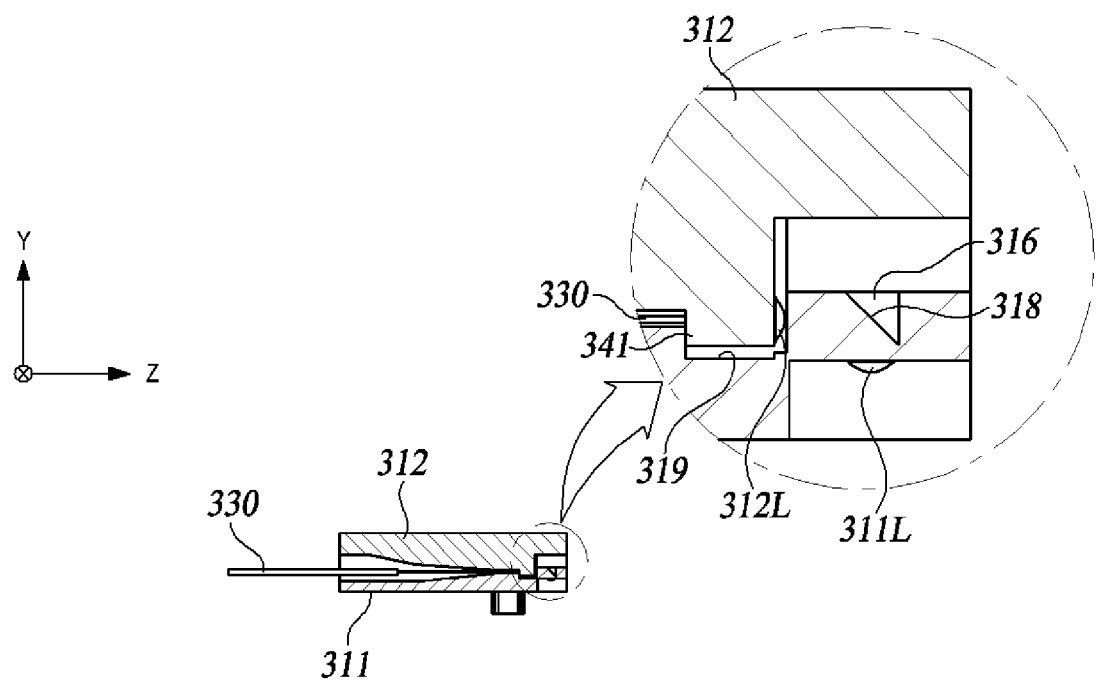
FIG. 7B is a longitudinal cross-sectional view of a first optical assembly cut in the direction of VII-VII' of FIG. 4A.

FIG. 7A is an exploded perspective view of a first optical assembly included in an optical module according to at least one embodiment of the present disclosure. FIG. 7B is a longitudinal cross-sectional view of the first optical assembly cut in the direction of VII-VII' of FIG. 4A.

The first cover 312 includes a pair of protrusions 341, and the first body 311 includes a receiving slot 319 for receiving the pair of protrusions 341. The pair of protrusions 341 are protruding from a lower side of the first cover 312. The receiving slot 319 is elongated across the first body 311 in the x-axis direction. When the first cover 312 is assembled with the first body 311, both ends of the receiving slot 319 define a pair of first openings (G1).

The third lens unit 312L is mounted on one lateral surface of the protrusion 341. When the first cover 312 is assembled with the first body 311, the opposite lateral surface of the protrusion 341 of the first cover 312 is in contact with an end of each of the first optical fiber 330. Thus, the width in the z-axis direction of the protrusion 341 (i.e., the distance between the two lateral surfaces) defines the distance between the first optical fiber 330 and the third lens unit 312L.

The width in the z direction of the protrusion 341 may be substantially the same as the focal length of the third lens unit 312L and, thereby, may cause the light passing through the third lens unit 312L to be concentrated on the core of the first optical fiber 330 without loss. That is, the protrusion 341 of the first cover 312 can serve as the transmitter spacer 244 shown in FIG. 2.

The first body 311 further includes a pair of first reflectors 318. The first reflectors 318 are given with inclined surfaces of a pair of triangular grooves 316 which are formed adjacent to the receiving slot 319. The pair of triangular grooves 316 are symmetrically elongated in the x-axis direction. In order to increase the reflectance of the first reflector 318, the inclined surfaces of the triangular grooves 316 may be polished or coated. The spacing between the triangular grooves 316 defines a passage 315 through which the second optical fibers 340 pass.

As mentioned with referring to FIG. 5B, the pair of first lens units 311L are disposed on the lower surface of the first body 311. When the first optical assembly 310 is engaged with a substrate, the pair of first lens units 311L are optically aligned or optically coupled with a pair of optical devices disposed on the substrate, respectively. The first reflector 318 may reflect light incident from the third lens unit 312L toward the first lens unit 311L. Alternatively, the first reflector 318 may reflect light incident from the first lens unit 311L toward the third lens unit 312L.

Accordingly, in the first optical assembly 310, the optical device disposed on the substrate, the first lens unit 311L, the first reflector 318, the third lens unit 312L and the first optical fiber 330 shall all be aligned to form one optical path.

The first body 311 utilizes at least one body post thereof to be fixedly engaged with the corresponding cover groove of the first cover 312. More specifically, the first body 311 has four body posts protruding from the corners thereof illustrated as first body posts 311a, 311b, 311c, and 311d which are engaged respectively with first cover grooves 312a, 312b, 312c, and 312d formed at the corners of the first cover 312.

The engagement structure between the first cover grooves 312a, 312b, 312c, and 312d and the first body posts 311a, 311b, 311c, and 311d serves to assist horizontal alignment between the third lens unit 312L formed on the first cover 312 and the first reflector 318 formed on the first body 311. Here, the horizontal direction means the x-direction or the z-direction shown in FIGS. 7A and 7B.

In particular, since the light between the first body 311 and the first cover 312 is theoretically a parallel beam of light, the optical alignment and optical coupling between the two subassemblies are insensitive to dimensional variations therebetween.

The positions of the first optical fibers 330 and the first cover 312 can be finely controlled with respect to a dimensional deviation, from the reference plane that is linked with the virtual plane p. This obviates the need for an additional optical fiber mechanism in the optical module 300 according to at least one embodiment of the present disclosure, in which the first-optical-fiber guides 313, the third-optical-fiber guide 314 and the passage 315 are integrally formed with the first body 311, unlike the conventional optical system.

Through the above-described optical alignment structure and method, precise control is achieved between the components forming the optical system included in the optical module according to the embodiments of the present disclosure. This allows to precisely and easily perform optical alignment without costly and time-consuming processes, and these optical modules can be mass-produced without expensive equipment because they are assembled by a manual alignment method.

The second optical fibers 340 are coupled to the second optical assembly 320 through the passage 315 formed in the first optical assembly 310 along the third-optical-fiber guide 314. The first-optical-fiber guides 313 and the third-optical-fiber guide 314 are formed by coupling the first cover portion 312 and the first body 311. In a case where the first cover 312 and the first body 311 are integrally formed, for example by using a process such as three-dimensional printing, the first-optical-fiber guides 313 and the third-optical-fiber guide 314 are formed as a part of the one-piece optical assembly.

The passage 315 is a groove-like void space existing on one side of the first body 311. The second optical fibers 340 are inserted into an empty space formed by the first body 311 and the first cover 312 and then pass through the third-optical-fiber guide 314 and the passage 315 until it is inserted into the second optical assembly 320. Here, the second optical fiber 340 is inserted in the z-direction.

The second optical fibers 340 that are optically aligned or optically coupled to the second optical assembly 320 can maintain the form of straight lines regardless of the position of the first optical assembly 310 so that the production efficiency is increased and the stable optical alignment and optical coupling are achieved.

The receiving slot 319 provides a space for the first optical fibers 330 and the protrusions 341 of the first cover 312 to be in contact one another. A supporting or fixing process of injecting an adhesive, an index matching material or the like into the space provided by the receiving slot 319 can block any contamination that may occur in the longitudinal ends of the first optical fibers 330 through a supporting or bonding process, and can minimize the refractive index difference between the longitudinal ends of the first optical fibers 330 and the first cover 312, thereby reducing the Fresnel reflection loss. In addition, the pair of first openings (G1) serves to flush out the adhesive or refractive index matching material excessively injected in the provided space.

Using this process, the optical assembly according to at least one embodiment of the present disclosure can maximize the efficiency of optical coupling.

Figure 8A:
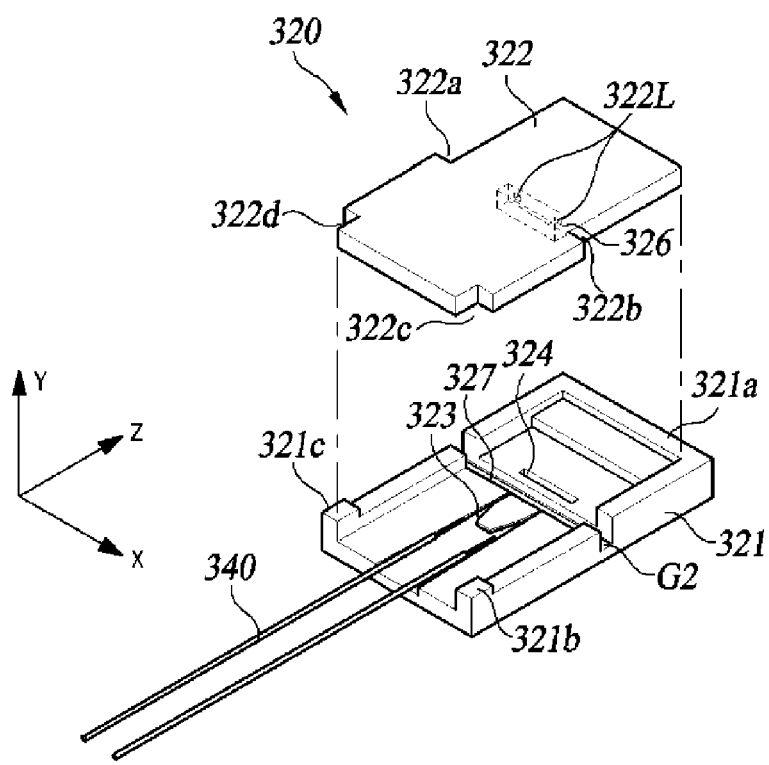
FIG. 8A is an exploded perspective view of a second optical assembly included in an optical module according to at least one embodiment of the present disclosure.
Figure 8B:
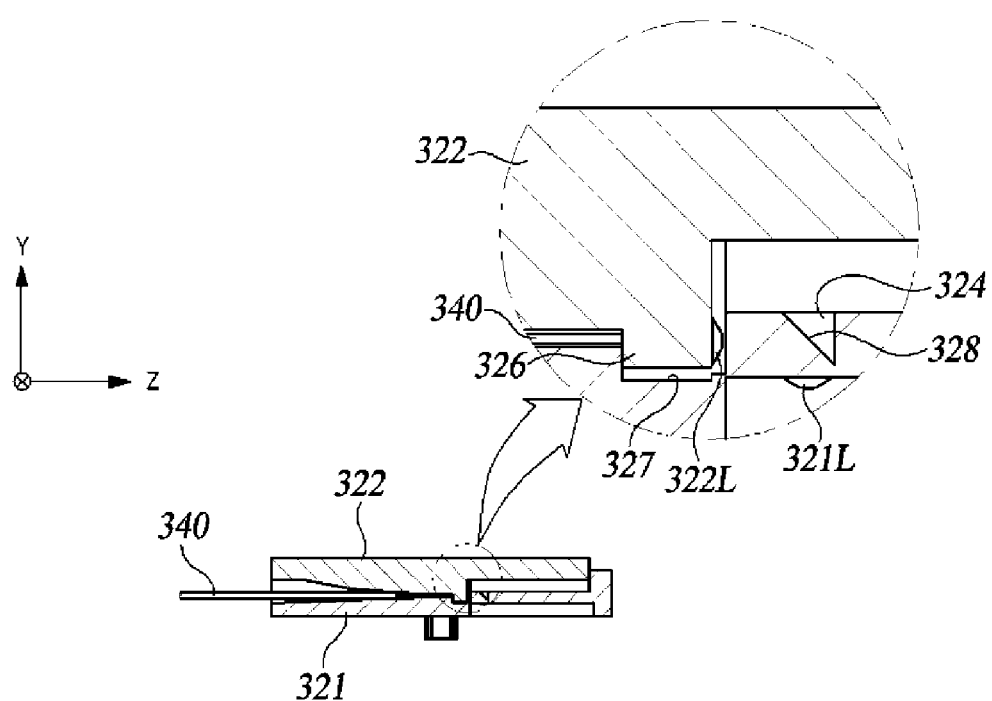
FIG. 8B is a longitudinal cross-sectional view of a second optical assembly cut in the direction of VIII-VIII' of FIG. 4A.

FIG. 8A is an exploded perspective view of a second optical assembly included in an optical module according to at least one embodiment of the present disclosure. FIG. 8B is a longitudinal cross-sectional view of the second optical assembly cut in the direction of VIII-VIII' of FIG. 4A.

The second cover 322 includes a protrusion 326, and the second body 321 includes a receiving slot 327 for receiving the protrusion 326. The protrusion 326 is protruding from a lower side of the second cover 322. The receiving slot 327 is elongated across the second body 321 in the x-axis direction. When the second cover 322 is assembled with the second body 321, both ends of the receiving slot 327 define a pair of second openings (G2).

The fourth lens unit 322L is mounted on one lateral surface of the protrusion 326. When the second cover 322 is assembled with the second body 321, the opposite lateral surface of the protrusion 326 of the second cover 312 is in contact with an end of each of the second optical fiber 340. Thus, the width in the z-axis direction of the protrusion 326 (i.e., the distance between the two lateral surfaces) defines the distance between the second optical fiber 340 and the fourth lens unit 322L.

The width in the z direction of the protrusion 326 may be substantially the same as the focal length of the fourth lens unit 322L and, thereby, may cause the light passing through the third lens unit 322L to be concentrated on the core of the second optical fiber 340 without loss. That is, the protrusion 326 of the second cover 322 can serve as the transmitter spacer 244 shown in FIG. 2.

The second body 321 further includes a second reflector 328. The second reflector 328 is given with an inclined surface of a triangular groove 324 which is formed adjacent to the receiving slot 327. In order to increase the reflectance of the second reflector 328, the inclined surface of the triangular groove 324 may be polished or coated.

As mentioned with referring to FIG. 5B, the pair of second lens units 321L are disposed on the lower surface of the second body 321. When the second optical assembly 320 is engaged with a substrate, the pair of second lens units 321L are optically aligned or optically coupled with a pair of optical devices disposed on the substrate, respectively. The second reflector 318 may reflect light incident from the fourth lens unit 322L toward the second lens unit 321L. Alternatively, the second reflector 328 may reflect light incident from the second lens unit 321L toward the fourth lens unit 322L.

Accordingly, in the second optical assembly 320, the optical device disposed on the substrate, the second lens unit 321L, the second reflector 328, the fourth lens unit 322L and the second optical fiber 340 shall all be aligned to form one optical path.

The second body 321 utilizes at least one body post thereof to be fixedly engaged with the corresponding cover groove of the second cover 322. More specifically, the second body 321 has three body posts protruding from the corners thereof illustrated as second body posts 321a, 321b, and 321c which are engaged respectively with second cover grooves 322a, 322b, 322c, and 322d formed at the corners of the second cover 322.

The second body posts 321a, 321b, and 321c formed in the second body 321 of the second optical assembly 320 included in the optical module 300 according to at least one embodiment of the present disclosure are different in shape from the first body posts 311a, 311b, 311c, and 311d formed in the first body 311 of the first optical assembly 310. However, an assembly of the same structure and material as the first optical assembly 310 may also be used as the second optical assembly 320.

The second cover 322 utilizes the second cover grooves 322a, 322b, 322c, and 322d thereof to be securely engaged with the second body posts 321a, 321b, and 321c formed on the second body 321, respectively. The engagement structure between the second cover grooves 322a, 322b, 322c and 322d and the second body posts 321a, 321b, and 321c serves to assist horizontal alignment between the fourth lens unit 322L formed on the second cover 322 and the second reflector 328 formed on the second body 321. Here, the horizontal direction means the x-direction or the z-direction shown in FIGS. 8A and 8B.

In particular, since the light between the second body 321 and the second cover 322 is theoretically a parallel beam of light, the optical alignment and optical coupling between the two subassemblies are insensitive to dimensional variations therebetween.

The positions of the second optical fibers 340 and the second cover 322 can be finely controlled with respect to a dimensional deviation, from the reference plane that is linked with the virtual plane p. This obviates the need for an additional optical fiber mechanism in the optical module 300 according to at least one embodiment of the present disclosure, in which the second-optical-fiber guides 323 are integrally formed with the second body 321, unlike the conventional optical system.

Meanwhile, the first optical assembly 310 and the second optical assembly 320 may be formed integrally, not separately.

Figure 9:
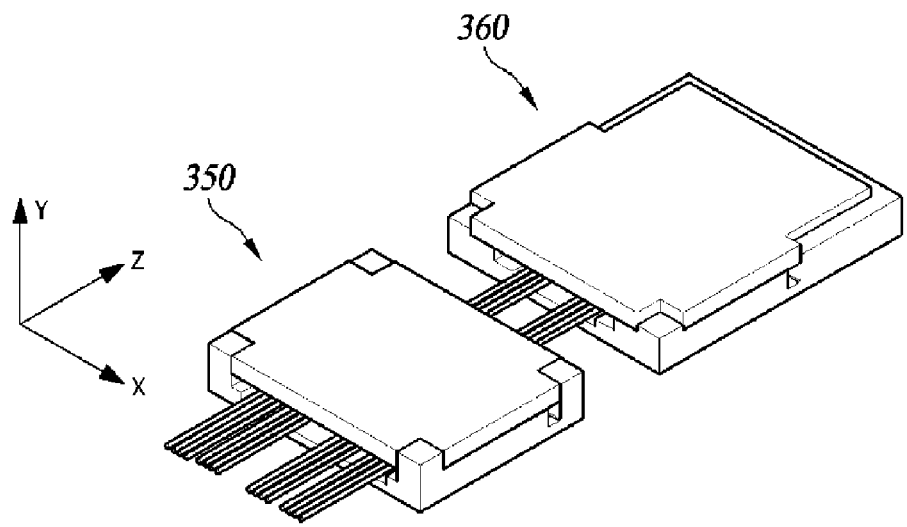
FIG. 9 is a perspective view of an optical module according to another embodiment of the present disclosure.

FIG. 9 is a perspective view of an optical module according to another embodiment of the present disclosure.

Although the number of optical fibers is shown as four in FIG. 3 to FIGS. 8A and 8B, the optical module 300 according to at least one embodiment of the present disclosure may include at least one optical fiber. With a single optical fiber or at least one optical fiber, the basic operation principle for transmitting and receiving optical signals is the same.

Although the optical module 300 according to at least one embodiment of the present disclosure includes a plurality of optical fibers, it is not necessary to provide all the components of the optical system as many as the number of optical fibers.

As shown in FIG. 9, the optical module 300 according to at least one embodiment of the present disclosure works evenly well whether it holds four optical fibers or sixteen optical fibers. The optical module 300 according to at least one embodiment may be configured to have as many optical fibers as possible theoretically within the allowable dimensional range of the first optical assembly 310 and the second optical assembly 320.

Figure 10A:
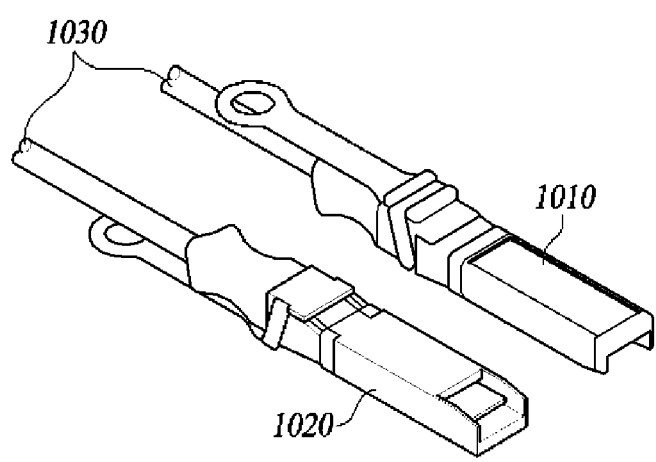
FIGS. 10A and 10B illustrate an active optical cable and an optical transceiver, which are exemplary applications of an optical module according to at least one embodiment of the present disclosure, respectively.
Figure 10B:
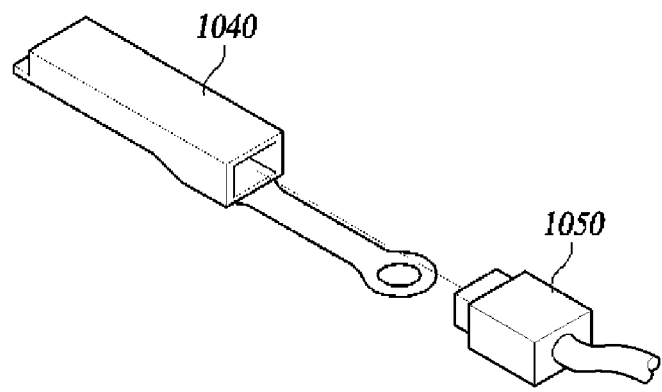

FIGS. 10A and 10B illustrate an active optical cable and an optical transceiver, which are exemplary applications of an optical module according to at least one embodiment of the present disclosure, respectively.

As shown in FIG. 10A, an active optical cable includes two optical modules 1010 and 1020, and an optical cable 1030 for interconnecting the two modules 1010 and 1020. Each of the two optical modules 1010 and 1020 is formed by including the optical module 300 according to at least one embodiment of the present disclosure described in FIGS. 3 to 9.

FIG. 10B shows a case of an optical transceiver 1040. The optical transceiver 1040 may be formed by including an optical module 300 according to at least one embodiment of the present disclosure.

FIG. 11 illustrates a cable-attached type optical transceiver which is another exemplary application of an optical module according to at least one embodiment of the present disclosure.

Figure 11A:
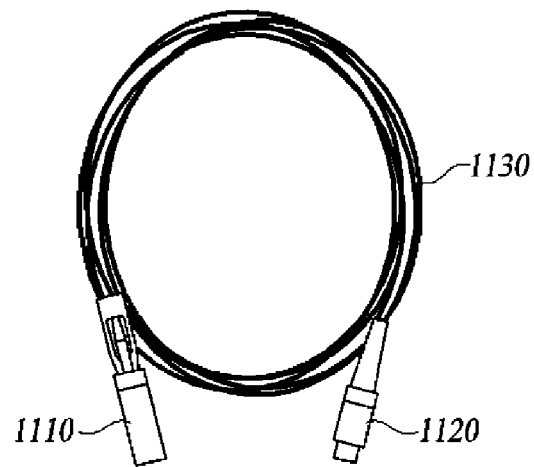
FIGS. 11A and 11B illustrate a cable-attached type optical transceiver which is another exemplary application of an optical module according to at least one embodiment of the present disclosure.

As shown in FIG. 11A, a cable-attached type optical transceiver includes an optical module 1110, a connector 1120 and an optical cable 1130.

The optical module 1110 is formed by including the optical module 300 according to at least one embodiment of the present disclosure described in FIGS. The connector 1120 is formed to include a structure capable of connecting a plurality of optical fibers and does not have any active elements therein. The structure or shape of the connector 1120 may be differentiated depending on the number of optical fibers included in the optical module 1110 and the number of optical channels or the structure or shape of the optical module to which the connector 1120 is connected. Here, the connector 1120 may be a multifiber push-on (MPO) connector or an MTP type connector for connecting a plurality of optical channels.

The optical cable 1130 is formed to include at least one optical fiber. In addition, the optical cable 1130 is formed so as to protect the at least one optical fiber.

Figure 11B:
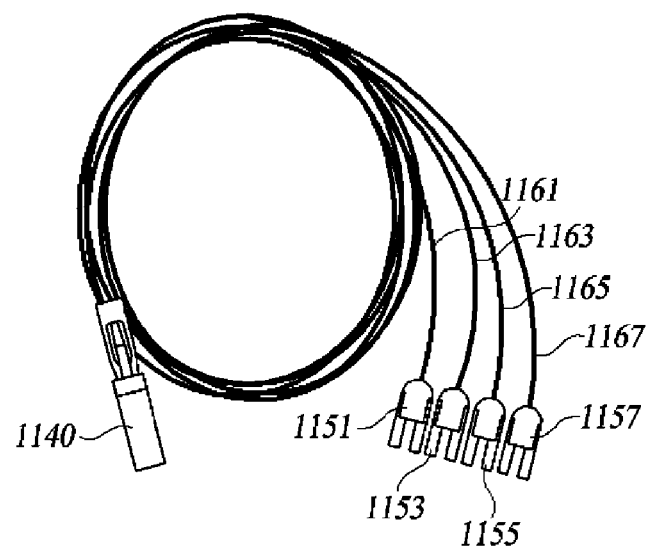

Referring to FIG. 11B, a cable-attached type optical transceiver includes an optical module 1140, a first connector 1151, a second connector 1153, a third connector 1155, a fourth connector 1157, a first optical cable 1161, a second optical cable 1163, a third optical cable 1165 and a fourth optical cable 1167.

The optical module 1140 is formed by including the optical module 300 according to at least one embodiment of the present disclosure described in FIGS. 3 to 9. Each of the first connector 1151, second connector 1153, third connector 1155 and fourth connector 1157 includes a structure capable of connecting a plurality of optical fibers, having no active elements therein.

Each of the first optical cable 1161, second optical cable 1163, third optical cable 1165, and fourth optical cable 1167 includes at least one optical fiber. In addition, the first optical cable 1161, second optical cable 1163, third optical cable 1165, and fourth optical cable 1167 are formed to protect the at least one optical fiber.

Here, the optical module 1140 may be formed to include four optical transmission units and four optical reception units, and each of the first connector 1151, second connector 1153, third connector 1155, and fourth connector 1157 may be formed to include two optical fibers. One of the two optical fibers included in each of the first connector 1151, second connector 1153, third connector 1155 and fourth connector 1157 is used to transmit optical signals from the connector side to the optical module 1140. The other one of the two optical fibers is used to transmit optical signals from the optical module 1140 side to the connector side.

As described above, at least one embodiment of the present disclosure is effective to provide an optical module which can improve the productivity by enabling efficient optical coupling between optical devices and optical fibers in an optical transmission-reception module using a plurality of optical fibers, while increasing the data transfer rate per unit module.

In addition, according to at least one embodiment of the present disclosure, the optical fiber is connected in a straight line through the optical assembly, to increase the durability of the optical fiber and provide a seamless optical connection, and the optical fiber is inserted in a straight line in the optical assembly, to effect an improved productivity of the optical module.

Although exemplary embodiments of the present disclosure have been described for illustrative purposes, those skilled in the art will appreciate that various modifications, additions, and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. An optical module, comprising:
   a substrate configured to support at least one optical device and at least one electronic device;
   a first optical assembly configured to optically couple a first optical fiber inserted from outside to a first optical device;
   a second optical assembly configured to optically couple a second optical fiber inserted from outside to a second optical device,
   wherein each of the first optical assembly and the second optical assembly is disposed at a predetermined position on the substrate, and the second optical fiber passes through an interior of the first optical assembly, to be optically coupled with the second optical assembly;
   a first body comprising a first lens unit and a first reflector and configured to change at least one selected among a direction and a shape of light emitted from the first optical device or incident on the first optical device; and
   a first cover comprising a third lens unit and configured to change at least one selected among a direction and a shape of light incident on the first optical fiber or emitted from the first optical fiber.

2. The optical module of claim 1, wherein the second optical assembly comprises:
   a second body comprising a second lens unit and a second reflector and configured to change at least one selected among a direction and a shape of light emitted from the second optical device or incident on the second optical device; and
   a second cover comprising a fourth lens unit and configured to change at least one selected among a direction and a shape of light incident on the second optical fiber or emitted from the second optical fiber.

3. The optical module of claim 2, wherein the first body comprises:

a passage configured to allow the second optical fiber to pass through one surface of the second optical assembly, making the second optical fiber be optically coupled with the second optical device.

4. The optical module of claim 2, wherein the first optical assembly is formed by integrating the first body and the first cover and forms a first optical path extending seamlessly along the first optical device, the first lens unit, the first reflector, the third lens unit, and the first optical fiber in order of occurrence.

5. The optical module of claim 2, wherein the second optical assembly is formed by integrating the second body and the second cover and forms a second optical path extending seamlessly along the second optical device, the second lens unit, the second reflector, the fourth lens unit, and the second optical fiber in order of occurrence.

6. The optical module of claim 4, wherein the first optical assembly comprises:
a first-optical-fiber guide and a third-optical-fiber guide, wherein the first-optical-fiber guide and the third-optical-fiber guide are formed by integrating the first cover and the first body.

7. The optical module of claim 5, wherein the second optical assembly comprises:
a second-optical-fiber guide,
wherein the second-optical-fiber guide is formed by integrating the second cover and the second body.

8. The optical module of claim 6, wherein the first optical fiber is configured to be fixated or supported to the first optical assembly by the first-optical-fiber guide.

9. The optical module of claim 7, wherein the second optical fiber is configured to be fixated or supported to the second optical assembly by the second-optical-fiber guide and a third-optical-fiber guide that is included in the first optical assembly.

10. The optical module of claim 1, wherein the first optical device or the second optical device comprises:
an electrical-to-optical conversion device for converting an electric signal into an optical signal, or an optical-to-electrical conversion device for converting an optical signal into an electric signal.

11. The optical module of claim 1, wherein the first optical fiber and the second optical fiber are arranged to be separated apart from the substrate by a predetermined distance or distances, and a virtual plane passing through both the first optical fiber and the second optical fiber is in parallel with the substrate.

12. The optical module of claim 1, wherein the first optical assembly and the second optical assembly are integrated with one another.

* * * * *